(12) United States Patent
Dunn et al.

(10) Patent No.: US 6,584,137 B1
(45) Date of Patent: Jun. 24, 2003

(54) METHOD FOR MAKING STEEL WITH ELECTRIC ARC FURNACE

(75) Inventors: Thomas Michael Dunn, Hilltop Lakes, TX (US); Erik Rene Ocklind Nissen, Hilltop Lakes, TX (US)

(73) Assignee: Nucor Corporation, Charlotte, NC (US)

(*) Notice: Subject to any disclaimer, the term of this patent is extended or adjusted under 35 U.S.C. 154(b) by 0 days.

(21) Appl. No.: 10/200,727

(22) Filed: Jul. 22, 2002

(51) Int. Cl.[7] ............................................. H05B 7/148
(52) U.S. Cl. ..................................................... 373/104
(58) Field of Search .......................... 373/42, 47, 102, 373/104, 108; 323/109, 124; 364/483, 487; 702/64; 700/274

(56) References Cited

U.S. PATENT DOCUMENTS

| | | |
|---|---|---|
| 5,572,544 A | 11/1996 | Mathur et al. |
| 5,573,573 A | 11/1996 | Berger et al. |
| 5,835,524 A | 11/1998 | Berger et al. |
| 5,936,995 A | 8/1999 | Sullivan et al. |
| 5,943,360 A | 8/1999 | Haissig |
| 5,956,365 A | 9/1999 | Haissig |
| 5,991,327 A * | 11/1999 | Kojori .................. 373/104 |
| 5,999,556 A | 12/1999 | Haissig |
| 6,084,902 A | 7/2000 | Hawk |
| 6,229,838 B1 | 5/2001 | Flichy et al. |
| 6,269,112 B1 | 7/2001 | Poloni et al. |

* cited by examiner

*Primary Examiner*—Tu Ba Hoang
(74) *Attorney, Agent, or Firm*—Barnes & Thornburg

(57) ABSTRACT

A method of making steel in an electric arc furnace is provided. The method comprises the steps of measuring electrical current in at least two phases of electrical power supplied to electrodes in the furnace during a campaign, establishing a setpoint current level and an input time interval, and switching between modes of inputting exothermic energy into the steel melt when at least two phases have measured current levels below the setpoint for the input time interval.

29 Claims, 2 Drawing Sheets

METHOD FOR MAKING STEEL WITH ELECTRIC ARC FURNACE

BACKGROUND & SUMMARY

This invention relates to steelmaking and particularly to the making of steel by electric arc furnace (EAF).

The electric arc furnace has evolved considerably with the use of exothermic reactions to complement the electric arc for scrap melting and steel refining. The exothermic reactions have come in two (2) forms: direct oxygen injection using oxygen lances, and the use of oxy-fuel burners. The problem is that each of these energy input systems is efficient for transferring heat in different parts of the campaign, but each must also be controlled to inhibit detrimental interaction between the electrodes, the oxy-fuel burners, and the oxygen lances (as well as to avoid any loss of production or losses of yield efficiency).

Oxy-fuel burners are common equipment in electric arc furnaces. Typically such burners are located in either the slag door or side wall of the EAF. The oxy-fuel burners are very efficient in heat transfer to the scrap at the start of the melt-in period, when the scrap is cold and has a large surface area. As melting proceeds, the efficiency of the oxy-fuel burners drops off dramatically as the scrap surface in contact with the flame decreases and the scrap temperature increases. It is generally recommended that using oxy-fuel burners to transfer heat energy to the melt be discontinued after 50% of the meltdown period is completed (so reasonable steelmaking efficiency is achieved).

Previously, the point at which the oxy-fuel burner use was discontinued was controlled by simply measuring the electricity consumption and cutting off the oxy-fuel burners at a pre-determined setpoint in the melting cycle. An alternative control for the oxy-fuel burners was to measure the temperature of the furnace side panels adjacent to the burners to track burner efficiency and shut off the burners when efficiency drops below a set point. Still another alternative control was measuring the offgas temperature (indicating that more heat is retained in the offgas) and discontinuing the oxy-fuel burner when a set point temperature was reached.

Use of oxygen lances has also become an integral part of EAF steelmaking operations. Water-cooled lances have been used generally for decarborization and dephosphorization of the steel, although in some cases such lances may be used during early melt-in period for scrap cutting as well. Such a conventional water-cooled lance was typically mounted on a platform and penetrated into the sidewall and/or slag door of the EAF furnace through a panel, where the lance sometimes penetrates into the slag layer but not into the molten bath. Consumable lances have also been used to penetrate into the slag layer or the molten bath. These consumable lances are usually composed of consumable pipe which is adjustable as they burn away to give efficient working length.

In more modern EAF furnaces, oxygen lancing has been done through the oxy-fuel burners by simply increasing the oxygen rates and decreasing the natural gas or propane rates through the burners. In any case, melting and refining of the steel during the campaign with the use of separate oxygen lances, or oxygen lancing through the oxy-fuel burners, can be highly efficient. However, such oxygen lancing of any type can negatively impact on productivity, can accelerate electrode erosion, and can have a detrimental effect on the electrodes. Further, oxygen lancing can create unacceptable levels of CO and NOX that must be consumed or otherwise disposed of in the offgas system.

Oxygen lancing takes advantage of exothermic reactions in oxidizing of carbon and iron in the steel melt creating CO and FeO, and in stirring of the molten steel resulting in temperature and composition homogeneity through the molten steel bath. When used for scrap cutting, the oxidation reaction is primarily with the iron resulting in high energy input as iron is reacted to produce FeO. However, this reaction has had a direct negative impact on yield, and therefore high oxygen rates have not been usually used during cut-in of the scrap. Later in the campaign, when a molten pool is formed, the FeO is reduced out of the slag by carbon in the bath. Thus, the net effect is to produce large amounts of CO gas from the oxygen that is injected by lancing.

The oxygen rate during lancing must therefore be controlled so as not to create excessive yield losses and generate high levels of CO that must be captured in the DES system and in unacceptable ambient levels in the work environment. Typically up to 10% of the CO not oxidized in the furnace is exhausted through the secondary fume capture system during meltdown of the steel. Moreover, the major drawback in high oxygen lance rates is the effect on fume system controls and the production of NOX. All of this must be taken into account in controlling and varying oxygen lance rates during the campaign, and balancing the natural gas or propane levels with the oxygen rates where the oxygen lancing and the oxy-fuel burning is done through the same orifices.

Furthermore, the carbon that reacts with the oxygen to form CO in the molten steel bath can be from the electrodes, increasing electrode erosion and melting costs. Typically carbon is injected into the bath to provide for decarbonization of the molten steel, but also to protect electrodes from such erosion. If in addition, the stirring effect of the oxygen lancing brings bath carbon or injected carbon into contact with the FeO in the slag, an even greater quantity of CO can be produced.

The carbon injection must be controlled for this purpose, as well as to cause foaming of the slag. The foaming of the slag has great benefits in operation of the electric arc furnace in greatly reducing heat loss to the side walls of the furnace, and channelling heat transfer from the electric arcs to the molten steel thereby providing for higher rates of energy input, reduced power and voltage fluctuations, reduced electrical and audible noise, and increased arc length without increasing heat loss, electrode consumption, or refractory consumption.

There is needed, therefore, a simple and efficient system for coordinating the operation of the oxy-fuel burning, oxygen lancing, carbon injection, and electrical current input so as to provide high productivity steelmaking in the EAF. The present invention provides just such a system.

The present invention involves a method of making steel in an electric arc furnace comprising the steps of: measuring electrical current in at least two of the three (3) phases of electric power supplied to the electrodes in an electric arc furnace during a campaign, and establishing at least one setpoint level for the measured electrical current and input time intervals for said setpoint current level for switching between operating modes of inputting exothermic energy or electrical energy, or both, to a steel melt in the electric arc furnace during a campaign. The switching between the modes of operation of inputting exothermic energy or electrical current, or both, is based upon measuring the electrical current in at least two of the three phases of electric power input to the electrodes of the electric arc furnace during a campaign and switching between operating modes when the setpoint current levels for setpoint time intervals for switching are measured.

For inputting exothermic energy to the steel melt in the electric arc furnace during a campaign, at least one setpoint for the measured electrical current and input time interval for said setpoint time interval for switching are established preferably for three operating modes of inputting exothermic energy. The first operating mode is to input exothermic energy to the steel scrap in the furnace following charging by combustion of a combustion fuel/oxygen mixture flow through one or more oxy-fuel burners. The combustion fuel may be natural gas, propane or fuel oil or another form of combustion fuel, and the oxygen is commercial grade oxygen generally about ninety eight percent (98%) purity, or better. The mixture in the first operating mode is high in combustion fuel and the oxygen to combustion fuel ratio is sufficient to combust at least most of the combustion fuel to melt scrap or other iron sources charged to the furnace. The ratio of the mixture of oxygen to combustion fuel during this operating mode may be about 2 to 1, or greater.

In the second operating mode, exothermic energy heat is inputted to the partially melted scrap or other iron sources in the electric arc furnace by combustion of a combustion fuel/oxygen mixture where the mixture has a reduced flow of combustion fuel and increased flow of oxygen, and is capable of cutting a hole through scrap to provide a path for oxygen injection into the melt. In the second mode, the ratio of oxygen to combustion fuel may be about 5 to 1, or greater.

In the third operating mode of inputting exothermic energy to the steel melt in the electric arc furnace during the campaign, oxygen is injected into the molten metal bath in the furnace to provide for decarbonization, dephosphorization and refining. The oxygen may be injected through separate oxygen lances, but preferably is injected through the oxy-fuel burners used in the first and second operating modes of inputting exothermic energy to the steel melt. In the third mode, where the oxygen is injected through the oxy-fuel burners, the ratio of oxygen to combustion fuel is at least about 11 to 1 and more desirably about 28 to 1.

Alternatively, or in addition to the control of exothermic energy input to the furnace, the electrical current in at least two phases of the three-phase electric power transferred to the electrodes in the furnace can be measured during a campaign, and the modes of operation of the electric arc furnace switched during the campaign based on the measured current levels reaching setpoint levels for set time intervals during the campaign. The first operating mode of inputting electrical current through the electrodes into the scrap within the furnace is a short arc as the electrodes are lowered into the furnace. The second operating mode inputting energy in the form of electrical current into the steel melt is a long arc primarily to melt the scrap and other sources of iron in the furnace. The third operating mode of inputting electrical current through the electrodes into the molten steel bath in the furnace is in a short arc to increase the temperature of the molten steel and to provide for decarbonization, dephosphorization, slag foaming and other refining.

The input setpoint levels of measured electrical current, and of the input time intervals, for switching between operating modes of inputting exothermic energy and of inputting electrical energy through the electrodes into the steel melt in the furnace may be independently set, or in some cases, may be the same. For example, the input setpoint electrical current levels and independent time intervals for switching between the first operating mode and the second operating mode of inputting exothermic energy may be the same or different than the setpoint levels of measured electrical current and time intervals for switching between the second operating mode and the third operating mode of inputting exothermic energy into the steel melt in the electric arc furnace during a campaign. Similarly, the setpoint levels of measured electrical current, and the time intervals for those current levels, for switching between the first operating mode and the second operating mode of inputting electrical energy through the electrodes to the steel melt in the electric arc furnace may be the same or different from the setpoint current levels and time intervals for switching from the second operating mode to the third operating mode of inputting electrical energy through the electrodes into the steel melt in the furnace. Also, the input setpoint electrical current levels and time intervals for switching between operating modes of inputting exothermic energy and of inputting electrical energy into the steel melt in the electric arc furnace may be the same or different.

The measured electrical current of the electric energy input during the three operating modes may be indirectly measured by a regulator, such as an AMI "Digiarc", that measures standard deviation of electrical current of the measured phases of electric power. Alternatively, the electrical current may be directly measured in at least two of the three phases or otherwise indirectly measured, for example, in the form of power or other units. In any case, the switching between operating modes of inputting exothermic energy and the operating modes of inputting electrical energy through the electrodes into the steel melt in the electric arc furnace during a campaign may be done automatically based on the electrical current values measured, directly or indirectly, in at least two of the three phases of electric power input. In any event, the operation of the electric arc furnace may be switched back to the previous mode of operation manually or automatically if the measured electrical current values increase above the same, or a separate setpoint levels, for that operating mode for the same or a different set time interval.

Carbon may also be injected into the electric arc furnace in the operation of the present invention manually, or automatically, as the modes of operation of inputting exothermic energy into the steel melt proceed. The carbon may be injected at a low rate manually or automatically during the second operating mode of exothermic energy input as required for slag foaming and melt-in carbon control, and the carbon may be injected at a higher rate during the third operating mode of inputting exothermic energy as required for slag foaming and decarbonization of the steel melt. The injection of carbon may be automatic during the third operating mode of exothermic energy input, as well as adjustable by the operator as required for slag foaming and decarbonization of the steel melt. The carbon may be injected in the second mode of exothermic input at a rate of at least one pound per minute, and in the third mode of exothermic energy input at a rate of at least one pound per minute. Carbon may also be injected in the first mode of exothermic energy input, generally manually, as melting and refining conditions may require.

Other aspects of the present invention as well as its benefits in operation will become apparent as the description of the following embodiments of the present invention proceed.

BRIEF DESCRIPTION OF THE DRAWINGS

The accompanying drawings illustrate an embodiment of the present invention and assist in describing the benefits of the invention, wherein.

DETAILED DESCRIPTION OF THE EMBODIMENTS ILLUSTRATED BY THE DRAWINGS

Figure 3:
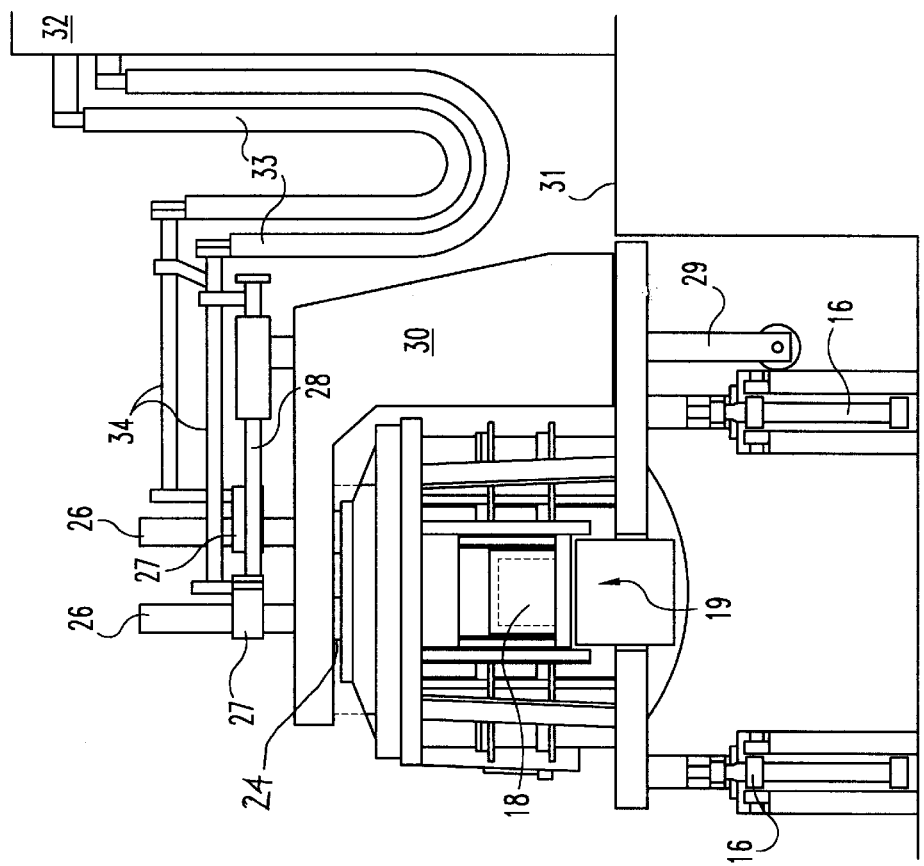
FIG. 3 is a back view of an electric arc furnace.
Figure 1:
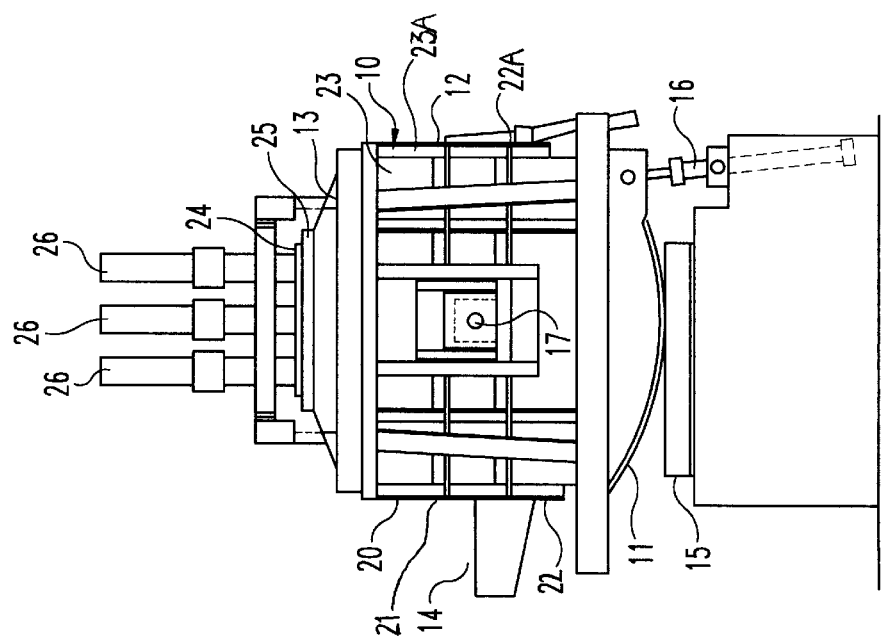
FIG. 1 is a side elevation of an electric arc furnace.
Figure 2:
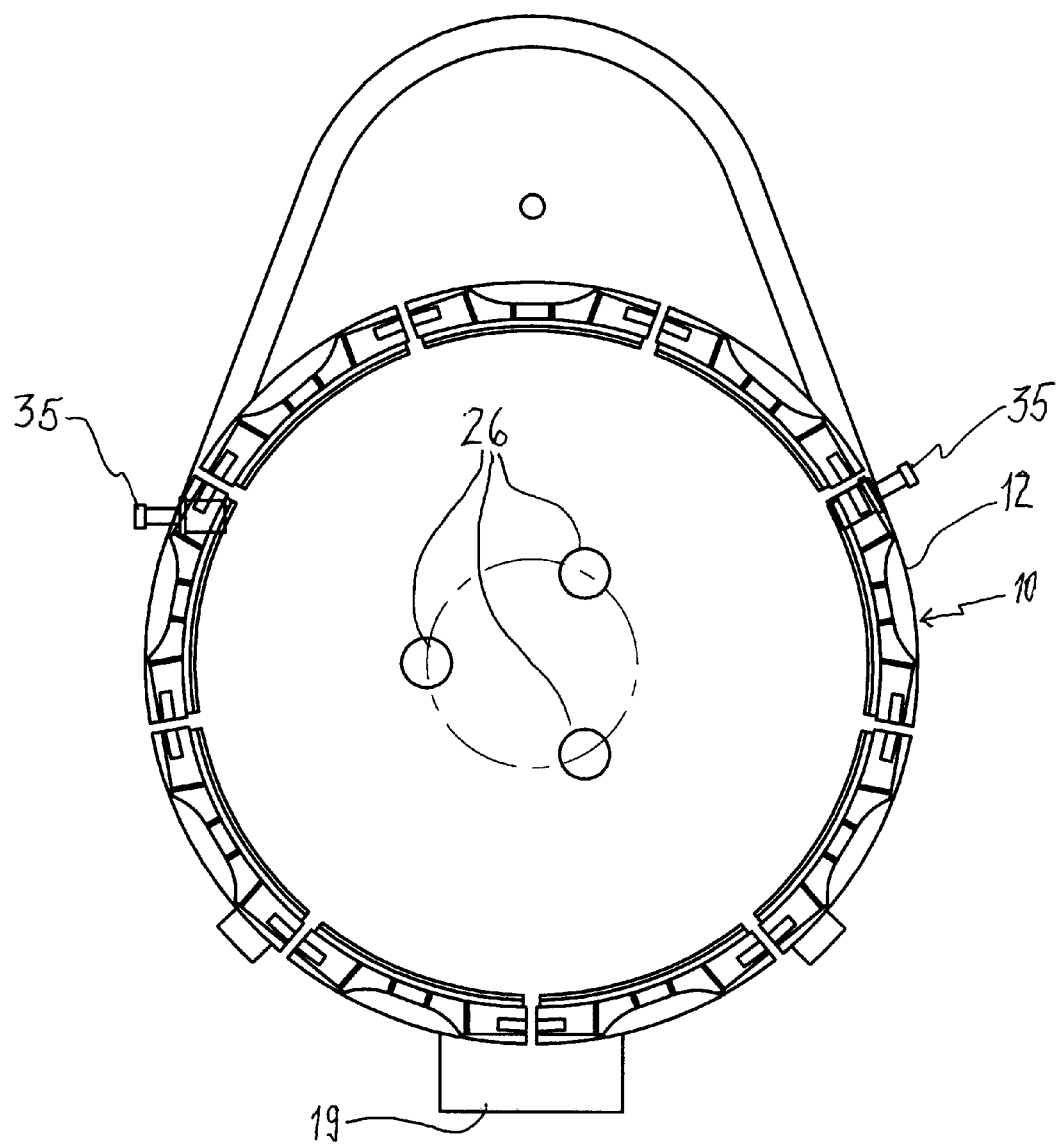
FIG. 2 is a top view of an electric arc furnace.

Electric arc furnace (EAF) 10 is generally cylindrical in shape, and has a generally spherical shaped bottom 11, sidewalls 12 and a roof 13. Although described above with reference to an AC EAF furnace, the invention may also be used with a DC EAF furnace. In either case, the bottom 11 is refractory lined, and the sidewalls 12 are generally refractory lined to above the slag line. The EAF also has a taphole/spout 14. The EAF rests on a rocker rail 15, and is capable of being tilted by hydraulic cylinders 16 to discharge the molten metal from the furnace through spout 14.

Also, provided in sidewall 12 is slide door 17 for charging and a backdoor 18 with a slag apron 19 for discharge of the slag from the furnace. The electric arc furnace 10 may have a split shell with a top portion 21 capable of being quickly decoupled and removed from a bottom portion 22. This facilitates and minimizes downtime due to change out of the top portion 21 of the furnace, and provides for rapid relining of the bottom portion 22 of the furnace. A sill line 22 A divides the upper portion 21 from the bottom portion 22 of the electric arc furnace.

The sidewalls 12 above the slag line usually are comprised of water-cooled panels 23 supported by a water-cooled cage 23A. The furnace roof 13 is also comprised of water-cooled panels with the center section of roof 13, surrounding the electrode ports 24 (called the roof delta 25) generally a cast section of refractory, which may be also water cooled. Electrodes 26 extend through the electrode ports 24 into the furnace. Electrodes 26 are supported by electrode holders 27, electrode mast arms 28 and electrode mast 29. Root 13 of the furnace may be removed and supported by jib structure 30 which may be supported by the operating floor level structure 31.

The transformers (not shown), housed in an electrical equipment vault 32, supply the electrical current to the electrodes 26 and the steel melt in the electric arc furnace. Secondary power cables 33 supply the electric power from the transformers to bus tubes 34. Also housed in the electrical equipment vault may be a regulator (not shown) that measures, directly or indirectly, the electrical current in at least two of the three phases of electric power supplied to the electrodes in the electric arc furnace. Preferably the electrical current is measured by measuring the standard deviation of at least two of in the three phases of electric power. The standard deviation of current of the three phases may be measured by a regulator known as a "Digiarc" made by AMI. However, any regulator which measures, directly or indirectly, the electrical current of the three phases of the electric power from the transformers through the electrodes 26 is appropriate for use in measuring the electrical current supplied to the electrodes of the electric arc furnace.

Also, provided in sidewalls 12 of the furnace 10 below the slag line is oxy-fuel burners 35. Oxy-fuel burners 35 may supply exothermic energy to the furnace in three modes of operation. The first operating mode may be a mixture of oxygen and combustion fuel generally in a ratio of about 2 to 1, or greater. The combustion fuel may be natural gas, propane, fuel oil or another appropriate source of combustion fuel. The oxygen is commercial grade oxygen generally available that is 98% pure oxygen, or better. The burners 35 may also have, in some embodiments, a shroud (not shown) forming an annulus around the main burner orifice, through which the same or a different mixture of oxygen and combustion fuel may be input into the electric arc furnace to supply exothermic energy to the steel melt. In any case, whether the oxy-fuel burners have shrouds or not, the combustion fuel/oxygen mixture flow through the oxy-fuel burners in the first mode is high in combustion fuel, with oxygen in the mixture sufficient to combust at least most of the combustion fuel, and capable of melting scrap or any other iron source charged to the furnace.

In the second mode of operation, the exothermic energy may be input to at least partially melted scrap and other iron source in the furnace by combustion of the combustion fuel/oxygen mixture flowever, the combustion fuel/oxygen mixture has a reduced flow of combustion fuel and an increased flow of oxygen, and is capable of cutting a hole through the scrap to provide a path for oxygen injection into the steel melt. The same combustion fuel and oxygen may be used in the second operating mode as in the first mode, but the ratio of oxygen to combustion fuel is generally at least about 5 to 1 during this operating mode.

In the third mode of operation, oxygen is injected into the molten metal bath in the furnace to provide decarbonization, dephosphorization and slag foaming. The oxygen is preferably injected through the same oxy-fuel burners 35 used in the first and second operating modes of exothermic operation. If desired, however, separate oxygen lances can be used for injection of the oxygen during the third mode of operation. If the oxygen is injected through the oxy-fuel burners 35, which is preferred, the ratio of oxygen to combustion fuel is at least about 11 to 1 and more desirably about 28 to 1. In this case, the combustion fuel in this third mode of operation supplies little of the exothermic energy to the steel melt.

Illustrated below in Table 1 is typical of the oxygen to combustion fuel mixtures used in the three modes of operation, for two types of oxy-fuel burners that may be used as burner 35. The Phoenix burner has a shroud as described above forming an annulus around a main orifice, and the PTI burner is a simpler oxy-fuel burner where the mixture of oxygen and combustion fuel is injected into the furnace through a singular orifice. The values for gas flow are of natural gas in standard cubic feet per minute, and the values of oxygen are of commercial grade oxygen in standard cubic feet per minute. The combustion fuel and oxygen flow mixtures, and the rates of flow of each, are manually set by the operator at the beginning of the campaign.

TABLE 1

| FIRST MODE | | | | | SECOND MODE | | | | | THIRD MODE | | | | | |
|---|---|---|---|---|---|---|---|---|---|---|---|---|---|---|---|
| Phoenix Burner | | | PTI | | Phoenix Burner | | | PTI | | Phoenix Burner | | | PTI | | |
| Ratio | Gas cfm | S—O₂ cfm | Gas cfm | O₂ cfm | Ratio | S—O₂ cfm | Gas cfm | O₂ cfm | Gas cfm | Ratio | S—O₂ cfm | Gas cfm | Ratio | O₂ cfm | Gas cfm |
| 2.1 | 4500 | 9000 | 4500 | 9000 | 5.3 | 23,850 | 4500 | 7000 | 4500 | 11 | 50,000 | 4500 | 16 | 32000 | 2000 |
| 2.1 | 4500 | 9000 | 4500 | 9000 | 5.3 | 23,850 | 4500 | 7000 | 4500 | 11 | 50,000 | 4500 | 16 | 32000 | 2000 |
| 2.1 | 4500 | 9000 | 4500 | 9000 | 5.3 | 23,850 | 4500 | 7000 | 4500 | 28 | 50,000 | 2200 | 16 | 32000 | 2000 |
| 2.1 | 4500 | 9000 | 4500 | 9000 | 5.3 | 23,850 | 4500 | 7000 | 4500 | 28 | 50,000 | 2200 | 16 | 32000 | 2000 |
| 2.1 | 4500 | 9000 | 4500 | 9000 | 5.3 | 23,850 | 4500 | 7000 | 4500 | 28 | 50,000 | 3000 | 16 | 32000 | 2000 |
| 2.1 | 4500 | 9000 | 4500 | 9000 | 5.3 | 23,850 | 4500 | 7000 | 4500 | 28 | 50,000 | 3000 | 16 | 32000 | 2000 |
| 2.1 | 4500 | 9000 | 4500 | 9000 | 5.3 | 23,850 | 4500 | 7000 | 4500 | 28 | 50,000 | 3000 | 16 | 32000 | 2000 |
| 2.1 | 4500 | 9000 | 4500 | 9000 | 5.3 | 23,850 | 4500 | 7000 | 4500 | 28 | 50,000 | 3000 | 16 | 32000 | 2000 |

One or more input setpoints for electrical current levels may also be set manually at the start of the campaign, along with the input time intervals for those setpoints, for switching between the three operating modes of inputting exothermic energy to the steel melt in the electric furnace during the campaign. These setpoint electrical current levels may be the same or different for each measured phase of the three phase electrical power, and may be the same or different for switching between the various operating modes. The time interval may be more than 2 minutes.

As noted above, the electrical current is measured in at least two, and preferably all three phases of the electric power supplied to the electrodes and the steel melt in the furnace. Typically, the electrical current is measured as the percent deviation of the electrical current in at least two of the three phases of the electric power. Switching between modes of operation may be done based on the measurement of the percent deviation in the three phases of electric power. Table 2 below shows typical setpoints for the electrical current levels and time intervals for said current levels for operation of the present invention. Once the percent deviation of electrical current has been found under the stated value in the table (amps) for the time in minutes in the next column, then the switch occurs in the next mode of operation of exothermic energy input. As noted above, the time interval may be two minutes, or may be 5 minutes as shown in the table.

TABLE 2

| First to Second Modes | | Second to Third Modes | |
|---|---|---|---|
| % Dist | Time (minutes) | % Dist | Time (minutes) |
| 700 | 5 | 400 | 5 |
| 700 | 5 | 400 | 5 |
| 800 | 5 | 500 | 5 |
| 800 | 5 | 500 | 5 |
| 800 | 5 | 500 | 5 |
| 800 | 5 | 600 | 5 |
| 900 | 5 | 600 | 5 |
| 800 | 5 | 600 | 5 |

Carbon may also be injected into the steel melt during the campaign at the second mode and third mode of operation. Carbon is typically injected into the furnace through the side wall. The carbon may be automatically injected at the second operating mode at a low rate, such as five pounds per minute, as required for slag foaming and melt-in carbon control. The carbon is injected at a higher rate (e.g. fifteen pounds per minute) in the third mode of operation as required for slag foaming and decarbonization of the melt. The rate of carbon injection in the third mode of operation may be automatic at the rate higher than the rate in the second mode of operation, and/or may be also adjustable by the operator as required for slag foaming and melt-in carbon control.

Generally there is no carbon injection automatically in the first mode of operation, but the operator may manually inject carbon if required to improve melt conditions. In any case the carbon injection is controlled by the standard deviation of electrical current measured in at least two of the three phases through a regulator and input to a computer program which in turn controls the furnace and the switching subsystem through program logic controls.

Alternatively, or in addition to the three modes of operation for control of the exothermic action, there may be three modes of operation of the onput of electrical energy through the electrodes to the steel melt. The three operating modes of electrical energy input into the steel melt is to start in the first mode in a "short arc" for a manually set time interval to allow the electrodes to bore down through the scrap charged to the furnace as electrodes are lowered. This mode of operation is long enough so that when the operation is switched to the second operating mode, there is no issue with the electricity arcing to the roof 13 of the furnace 10. In the second operating mode, the electrical energy is input from the electrodes to steel melt through in a "long arc", which is primarily for melting of solid steel scrap and other sources of iron. The input of electrical energy into the melt is then switch to "short arc" in the third operating mode when at least two phases of electrical current levels have stayed below the setpoint for the current levels for switching from the second to third operating modes for a set time interval. This third operating mode uses a high current and is commonly referred to as "short arc", and is primarily used to increase the temperature of the molten steel and facilitate decarbonization, dephosphorization and other steel refining.

The "short arc" and "large arc" are distinguished by the power factor. An example of a "short arc" may be a power factor of 7.5, and an example of "long arc" may be a power factor of 8.0. Typically, "short arc" is a low voltage and high current, and "long arc" is a high voltage and low current; however, both "long arc" and "short arc" may be achieved with the same voltage. For example, "long arc" can be achieved with a voltage of 480 volts and a current of 34,000 amps; and a "short arc" can be achieved with voltage of 480 volts and a current of 37,000 amps.

In any case, a second setpoint electrical current level, preferably measured indirectly as standard deviation of electrical current, may be used to determine if and when the furnace operating mode steps back from the short arc used in the third mode to the long arc used in the second mode. The regulator may be capable of switching the furnace operation back to the second mode on all charges when these setpoint current levels are achieved, except for the last charge (when the operator informs the computer logic controls that the furnace is on its last charge). In the last charge, a third set of setpoint current levels are used to determine if the system will cycle out of the third mode back to the melt (first) operating mode and keep the furnace on short arc.

The results of operating an electric arc furnace using the present invention are shown in Tables 3 and 4 below. The first two entries for October 2001 and November 2001 are before the present method was instituted. The results of the present method is then shown for the periods in the electric arc furnace operations from Dec. 10–15, 2001 through Feb. 28–Mar. 20, 2002. Table 4 reports selected results for pre-invention operation of an EAF and operation of the EAF in accordance with the present invention, as well as the differences observed. As can be seen, the present method decreased substantially the kilowatt hours per ton consumed and natural gas per ton consumed, and increased the amount of oxygen per ton that was consumed. The method also decreased tap-to-tap time and power-on time. Most importantly, it decreased the cost per ton of steel made in the electric arc furnace by $2.38 per ton.

TABLE 3

| Date Range | Heat Size (tons) | KWH/t | O/ton (cfm/ton) | NG/ton (cfm/ton) | Tap-Tap (hour) | Power on Time (mins) | Injected Carbon (lbs per ton) | $/ton |
|---|---|---|---|---|---|---|---|---|
| Oct. 01 | 50 | 402 | 1132 | 232 | 1:28 | 55 | 26 | $24.22 |
| Nov 01 | 52 | 395 | 1126 | 247 | 1:24 | 56 | 32 | $23.89 |
| Dec 10–15 | 51 | 394 | 1152 | 246 | 1:22 | 53 | 24 | $23.92 |
| Dec 16–22 | 51 | 397 | 1209 | 246 | 1:22 | 55 | 28 | $24.24 |
| Jan 8 | 54 | 382 | 1280 | 228 | 1:20 | 57 | 25 | $23.27 |
| Jan 8–24 | 52 | 379 | 1289 | 193 | 1:22 | 55 | 23 | $23.27 |
| Jan 24–Feb 12 | 53 | 368 | 1267 | 200 | 1:21 | 54 | 29 | $22.68 |
| Feb 12–19 | 52 | 350 | 1187 | 191 | 1:20 | N/A | N/A | $21.54 |
| Feb 18–27 | 52 | 362 | 1201 | 169 | 1:21 | N/A | N/A | $22.07 |
| Feb 28–Mar 20 | 50 | 355 | 1235 | 177 | 1:19 | N/A | N/A | $21.85 |

TABLE 4

| | RESULTS | | | | | | |
|---|---|---|---|---|---|---|---|
| | Heat Size (ton) | KWH/t | O/ton (cfm/ton) | NG/ton (cfm/ton) | Tap-Tap (hours) | Power on Time (mins) | $/ton |
| Oct. 1–Nov. 30 | 51 | 398 | 1129 | 240 | 1:26 | 55 | $24.22 |
| Dec 16–22 | 51 | 308 | 1209 | 246 | 1:22 | 55 | $24.24 |
| Feb 28–Mar 20 | 50 | 355 | 1235 | 177 | 1:19 | N/A | $21.85 |
| Change | −1 | −43 | 66 | −66 | −0:04 | −1.3 | −$2.38 |

It is understood that this description of these embodiments of the present invention are intended for illustrative purposes only. The invention may be otherwise embodied in other forms within the scope of the following claims that will be apparent to those skilled in the art and such other embodiments are desired to be protected.

What is claimed is:

1. A method of making steel in an electric arc furnace comprising the steps of:

(a) measuring the electrical current in at least two phases of three (3) phases of electrical power through electrodes into a steel melt in an electric arc furnace during a campaign;

(b) establishing at least one setpoint current level for the measured electrical current and input time interval for said setpoint current level for switching between modes of inputting exothermic energy into the steel melt in the electric arc furnace during the campaign;

(c) switching between the modes of inputting exothermic energy based on measuring the electrical current in the measured phases of electrical power input through the electrodes of the furnace to determine when at least two (2) of the three (3) phases have measured current levels below the setpoint for the input time interval.

2. A method of making steel in an electric arc furnace as claimed in claim 1 wherein the measurement of current in the three (3) phases of the electric power through the electrodes into the steel melt in the furnace is measured by measuring the percent deviation of the electrical current in any two of the three phases of inputted electrical power.

3. A method of making steel in an electric arc furnace as claimed in claim 1 wherein the electrical current of at least two of the three phases of the electrical power are measured by a regulator that reports standard deviation of current of the measured phases.

4. A method of making steel in an electric arc furnace comprising the steps of:

(a) measuring the electrical current in at least two of three (3) phases of electrical power transmitted to electrodes in an electric arc furnace during a campaign;

(b) establishing at least one setpoint current level for the measured electrical current and input time interval for said setpoint current level for switching between modes of electric energy input into a steel melt in the electric arc furnace during a campaign;

(c) switching between modes of inputting electrical current through the electrodes in the electric arc furnace when the electrical current levels in at least two of the three phases of electric power are determined to be below the input setpoint for the input time interval.

5. A method of making steel in an electric arc furnace as claimed in claim 4 wherein the measurement of electrical current in at least two of the three (3) phases of the electric power through the electrodes into the steel melt in the furnace is measured by measuring the percent deviation of the electrical current in any two of the three phases.

6. A method of making steel in an electric arc furnace as claimed in claim 4 wherein the electrical current of the measured phases in the electrical power are measured by a regulator that reports standard deviation of current of the measured phases.

7. A method of making steel in an electric arc furnace as claimed in claim 4 comprising the additional steps of:

(d) establishing setpoints for measured electrical current levels and input time intervals for said setpoint current levels for switching between modes of inputting exothermic energy into the steel melt in the electric arc furnace during the campaign;

(e) switching between the modes of inputting exothermic energy based on measuring the current in the measured phases of electrical power input through the electrodes of the furnace to determine when at least two (2) of the three (3) phases are measured to be below an input setpoint electrical current level for an input time interval;

(f) measuring the electrical current in at least two of the three (3) phase electrical power through electrodes into a steel melt in an electric arc furnace during a campaign.

8. A method of making steel in an electric arc furnace as claimed in claim 7 wherein the measured electrical current of the electrical power to the electrodes is measured by a regulator that reports standard deviation of electrical current of the measured phases of electrical power.

9. A method of making steel in an electric arc furnace as claimed in claim 7 wherein the measurement of electrical current in the measured phases of the electric power to the electrodes in the furnace is measured by measuring the percent deviation of the electrical current in any two of the three phases.

10. A method of making steel in an electric arc furnace comprising the steps of:

(a) measuring the current in at least two of three (3) phase of electric power to electrodes of an electric arc furnace during a campaign;

(b) establishing at least one input setpoint in the measured electrical current levels and input time intervals for said electrical current levels for switching between the following three modes of inputting exothermic energy into the steel melt in the electric arc furnace during a campaign:

(i) first mode, inputting heat to the steel scrap in the furnace by combustion of a combustion fuel/oxygen mixture flow through one or more oxy-fuel burners to melt scrap or other iron sources charged to the furnace, where said mixture is high in combustion fuel with sufficient oxygen to combust at least most of the combustion fuel;

(ii) second mode, inputting heat to the partially melted scrap or other iron sources in the furnace by combustion of a combustion fuel/oxygen mixture where said mixture has a reduced flow of combustion fuel flow and increased oxygen flow capable of cutting a hole through scrap to provide a path for oxygen injection into the melt; and (iii) third mode, injecting oxygen into the molten metal bath in the furnace to provide for decarbonization, dephosphorization and refining;

(c) switching between the three modes of inputting exothermic energy based on measuring the electrical current of at least two of three phases of electric power input to the electrodes of the furnace and determining when at least two of the three phases are determined to be below an input setpoint electrical level for an input time interval.

11. A method of making steel in an electric arc furnace as claimed in claim 10 wherein the electrical current in the measured phases of the electric power to the electrodes in the furnace is measured by measuring the percent deviation of electrical current in two of the three phases of electrical power.

12. A method of making steel in an electric arc furnace as claimed in claim 10 wherein the switch between modes based upon the electrical current in at least two phases being determined to be below an input setpoint of electrical current for an input time interval is automatic, and switching back to the previous mode of operation automatically if the electrical current increases above a setpoint of electrical current for the mode for the same or a separately input time interval.

13. A method of making steel in an electric arc furnace claimed in claim 10 where carbon is injected at a low rate during the second mode of operation as required for slag foaming and melt-in carbon control; and carbon is injected at a higher adjustable rate during the third mode of operation as required for slag foaming and decarbonization of the melt.

14. A method of making steel in an electric arc furnace as claimed in claim 10 wherein the electrical current of the measured phases of the electric power are measured by a regulator that reports standard deviation of current of the measured phases.

15. A method of making steel in an electric arc furnace as claimed in claim 10 wherein the input setpoint for the measured electrical current levels and input time interval for said current levels for switching between the three modes of operation is the same between the first and second modes and between the second and third modes.

16. A method of making steel in an electric arc furnace as claimed in claim 10 wherein the oxygen in the third mode is injected into the melt through the same orifice as the oxy-fuel mixture in the first mode and the second mode.

17. A method of making steel in an electric arc furnace as claimed in claim 16 wherein the oxy-fuel burners have a shroud that provides injection of combustion fuel and oxygen at the same or different rate than the main orifice of the burner.

18. A method of making steel in an electric arc furnace as claimed in claim 10 wherein the first mode the ratio of oxygen to combustion fuel is at least about 2 to 1, in the second mode the ratio of oxygen to combustion fuel is at least about 5 to 1 and in the third mode the ratio of oxygen to combustion fuel is at least about 10 to 1.

19. A method of making steel in an electric arc furnace as claimed in claim 10 wherein the first mode the ratio of oxygen to combustion fuel is at least about 2 to 1, in the second mode the ratio of oxygen to combustion fuel is at least about 5 to 1 and in the third mode the ratio of oxygen to combustion fuel is at least about 10 to 1.

20. A method of making of steel in an electric arc furnace as claimed in claim 18 wherein the ratio of oxygen to combustion fuel in the third mode is at least 28 to 1.

21. A method of making steel in an electric arc furnace as claimed in claim 13 wherein the carbon is injected in the second mode of operation at the rate of at least one pound per minute and in the third mode of operation at a rate of at least two pounds per minute.

22. A method of making steel in an electric arc furnace as claimed in claim 11 wherein the input setpoint of measured electrical current is at least 100 amps and the time interval for said electrical current level is at least two minutes.

23. A method of making steel in an electric arc furnace comprising steps of:
 (a) measuring the electrical current in at least two phases of three-phase electrical power to electrodes in an electric arc furnace;
 (b) establishing input setpoints of measured electrical current levels and input time intervals for said electrical current levels for switching between the following three modes of electrical inputting current through the electrodes to a steel melt in the electric arc furnace during a campaign:
  (i) first mode, inputting energy in the form of electric current arcing from electrodes to scrap within the furnace in a short arc;
  (ii) second mode, inputting energy in the form of electric current into the melt through the electrodes primarily to melt the scrap and other sources of iron in the furnace;
  (iii) third mode, inputting energy in the form of electric power through electrodes into molten steel bath in the furnace to increase the temperature of the molten steel and to provide for decarbonization, dephosphorization and other refining;
 (c) switching between the three modes based on measuring the electrical current in at least two of the three phases of electric power input to the electrodes in the electric arc furnace when the electrical current in two of the three phases are determined to be below an input setpoint for an input time interval.

24. A method of making steel in an electric arc furnace as claimed in claim 23 wherein the measurement of electrical current in the at least two of the three (3) phases of the electric power to the electrodes in the electric arc furnace is measured by measuring the percent deviation of the electrical current in any two of the three phases of the electrical power.

25. A method of making steel in an electric arc furnace as claimed in claim 23 wherein the electric current of the measured phases of the electrical power are measured by a regulator that reports standard deviation of current of the measured phases.

26. A method of making steel in an electric arc furnace as claimed in claim 23 wherein the switch is automatic between the operating modes based upon the electrical current of at least two phases of the electrical power being below an input setpoint level for an input time interval, and switching back to the previous mode of inputting electrical current automatically if the electrical current increases above a setpoint level for the mode for the same or a different input time interval.

27. A method of making steel in an electric arc furnace as claimed in claim 23 comprising the additional steps of:
 (a) establishing input setpoints for the electrical current levels and input time intervals for said levels for switching between the following three modes of inputting exothermic energy to the electric arc furnace during a campaign:
  (i) first mode, inputting heat to the steel scrap in the furnace by combustion of a combustion fuel/oxygen mixture flow through one or more oxy-fuel burners to melt scrap or other iron sources charged to the furnace, where said mixture is high in combustion fuel flow with oxygen such that the gas to oxygen ratio is sufficient to combust at least most of the combustion fuel;
  (ii) second mode, inputting heat to the partially melted scrap or other iron sources in the furnace by combustion of a combustion fuel/oxygen mixture where said mixture has a reduced flow of combustion fuel flow and increased oxygen flow capable of cutting a hole through scrap to provide a path for oxygen injection into the melt; and
  (iii) third mode, injecting oxygen into the molten metal bath in the furnace to provide for decarbonization, dephosphorization and refining;
 (b) switching between the three modes of inputting exothermic energy based on measuring the electrical current of at least two of the three phases of electric power input to the electrodes of the furnace when two of the three phases are determined to be below a setpoint level for the electrical current for set time interval.

28. A method of making steel in an electric arc furnace as claimed in claim 26 wherein the measurement of electrical current of the electric power to the electrodes in the furnace is measured by measuring the percent deviation of the electrical current any two of the three phases of electric power.

29. A method of making steel in an electric arc furnace as claimed in claim 26 wherein the electrical current in the measured phases of the electric power are measured by a regulator that reports standard deviation of current of the measured phases.

* * * * *